(12) United States Patent
Swaminathan et al.

(10) Patent No.: US 11,638,007 B2
(45) Date of Patent: *Apr. 25, 2023

(54) CODEBOOK GENERATION FOR CLOUD-BASED VIDEO APPLICATIONS

(71) Applicant: Adobe Inc., San Jose, CA (US)

(72) Inventors: Viswanathan Swaminathan, Saratoga, CA (US); Rashmi Mittal, Bangalore (IN)

(73) Assignee: Adobe Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/446,862

(22) Filed: Sep. 3, 2021

(65) Prior Publication Data

US 2021/0400278 A1  Dec. 23, 2021

Related U.S. Application Data

(63) Continuation of application No. 16/295,154, filed on Mar. 7, 2019, now Pat. No. 11,115,663, which is a
(Continued)

(51) Int. Cl.
*H04N 19/13* (2014.01)
*H04N 19/94* (2014.01)
(Continued)

(52) U.S. Cl.
CPC ........... *H04N 19/13* (2014.11); *H04N 19/176* (2014.11); *H04N 19/196* (2014.11); *H04N 19/94* (2014.11)

(58) Field of Classification Search
CPC ............................. H04N 19/13; H04N 19/176
See application file for complete search history.

(56) References Cited

U.S. PATENT DOCUMENTS 5,124,791 A  *  6/1992  Israelsen ................ H04N 19/94
                                                        375/240
5,677,986 A    10/1997  Amada et al.
(Continued)

FOREIGN PATENT DOCUMENTS

| CN | 1120268 A | 4/1996 |
| CN | 104918046 A | 9/2015 |
| EP | 0831659 B1 | 8/2003 |

OTHER PUBLICATIONS

Blelloch, Guy E., "Introduction to Data Compression," Computer Science Department, Carnegie Mellon University, Jan. 31, 2013. 55 pages.
(Continued)

*Primary Examiner* — Jerry T Jean Baptiste
(74) *Attorney, Agent, or Firm* — Finch & Maloney PLLC

(57) ABSTRACT

Techniques are disclosed for the improvement of vector quantization (VQ) codebook generation. The improved codebooks may be used for compression in cloud-based video applications. VQ achieves compression by vectorizing input video streams, matching those vectors to codebook vector entries, and replacing them with indexes of the matched codebook vectors along with residual vectors to represent the difference between the input stream vector and the codebook vector. The combination of index and residual is generally smaller than the input stream vector which they collectively encode, thus providing compression. The improved codebook may be generated from training video streams by grouping together similar types of data (e.g., image data, motion data, control data) from the video stream to generate longer vectors having higher dimensions and greater structure. This improves the ability of VQ to remove
(Continued)

redundancy and thus increase compression efficiency. Storage space is thus reduced and video transmission may be faster.

20 Claims, 9 Drawing Sheets

Related U.S. Application Data continuation of application No. 15/055,913, filed on Feb. 29, 2016, now Pat. No. 10,264,262.

(51) Int. Cl.
  *H04N 19/176* (2014.01)
  *H04N 19/196* (2014.01)

(56) References Cited

U.S. PATENT DOCUMENTS

| | | | |
|---|---|---|---|
| 10,063,892 B2 | 8/2018 | Swaminathan et al. | |
| 11,032,578 B2 | 6/2021 | Swaminathan et al. | |
| 2003/0007559 A1 | 1/2003 | Lallet et al. | |
| 2003/0123552 A1* | 7/2003 | Prakash | H04N 19/507 375/E7.193 |
| 2004/0174278 A1 | 9/2004 | Kadono et al. | |
| 2005/0004795 A1* | 1/2005 | Printz | H04N 19/94 704/E15.045 |
| 2010/0220937 A1 | 9/2010 | Furbeck | |
| 2012/0082217 A1 | 4/2012 | Haskell | |
| 2013/0342357 A1 | 12/2013 | Li | |
| 2015/0271450 A1 | 9/2015 | Van Coppenolle et al. | |
| 2017/0026665 A1 | 1/2017 | Duan et al. | |
| 2017/0063392 A1* | 3/2017 | Kalevo | H03M 7/40 |

OTHER PUBLICATIONS

Blelloch, Guy, "Algorithms in the Real World: Lecture Notes (Fall 1997)," Apr. 23, 1998. 303 pages.

Shahbahrami, et al., "Evaluation of Huffman and Arithmetic Algorithms for Multimedia Compression Standards," Retrieved from the Internet—Nov. 1, 2015. URL: http://arxiv.org/ftp/arxiv/papers/1109/1109.0216.pdf. 11 pages.

Wagner, David, "CS 170: Efficient Algorithms and Intractable Problems," Handout 16, UC Berkeley, Apr. 1, 2003. 4 pages.

Notice of Allowance in U.S. Appl. No. 17/338,764 (dated Oct. 5, 2022) (4 pages).

Deutsch, P. et al., "DEFLATE Compressed Data Format Specification version 1.3", Network Working Group Request for Comments 1951, retrieved from <https://www.rfc-editor.org/rfc/rfc1951> (May 1996).

Sullivan et al., "Overview of the High Efficiency Video Coding (HEVC) Standard", IEEE Transactions on Circuits and Systems for Video Technology, vol. 22, No. 12(Dec. 2012).

Wikipedia, The Free Encyclopedia: Data Deduplication, retrieved from <https://en.wikipedia.org/w/index.php?title=Data_deduplication &oldid=673141320>, last edited Jul. 26, 2015.

* cited by examiner

CODEBOOK GENERATION FOR CLOUD-BASED VIDEO APPLICATIONS

REFERENCE TO PRIOR APPLICATIONS

This application is a continuation of U.S. patent application Ser. No. 16/295,154 (filed 7 Mar. 2019), which is a continuation of U.S. patent application Ser. No. 15/055,913 (filed 29 Feb. 2016). The entire disclosure of both of these priority applications is hereby incorporated by reference herein.

FIELD OF THE DISCLOSURE

This disclosure relates to techniques for video processing, and more particularly, to techniques for generating codebooks to carry out improved coding of compressed video content.

BACKGROUND

In general, data compression reduces the size of a digital file. A compression algorithm typically makes the digital file smaller by representing strings of bits (i.e., logical 1s and 0s), which make up the digital file, with smaller strings of bits. For example, in some systems, this may be accomplished by using a dictionary, or so-called codebook. This reduction typically happens at the encoding stage prior to transmission or storage. So, when such a reduced-size string is received at the decoding stage for playback, the decoding algorithm uses the codebook to reconstruct the original content from the compressed representation generated by the encoding algorithm. Whether the reconstructed content is an exact match of the original content or an approximation thereof depends on the type of compression employed. Lossless compression algorithms allow the original content to be reconstructed exactly from the compressed message, while lossy compression algorithms only allow for an approximation of the original message to be reconstructed. Lossless compression algorithms are typically used where data loss of original content is problematic (such as the case with executable files, text files, and digital data files where loss of even a single bit may actually change the meaning of the content). Lossy compression algorithms are typically used for images, audio, video, and other such digital files where a degree of intentional data loss is imperceptible or otherwise at an acceptable level. With respect to lossy compression, note that the bit loss is not random; rather, the loss is purposeful (bits representing imperceptible sound or visual distinctions or noise can be targeted for exclusion by the lossy compression algorithm).

Data compression is commonly used in applications where the storage space or bandwidth of a transmission path is constrained. For example, images and video transmitted via a communication network such as the Internet are typically compressed. One such example case is the so-called "cloud DVR" service, which allows for streaming of compressed digital video content from a remote digital video recorder to a user's playback device, such as a television, desktop or laptop computer, tablet, smartphone, or other such playback device. Numerous compression schemes are available for streamed video including, for example, the various MPEG compression algorithms, as well as codebook-based Vector Quantization (VQ) techniques.

Codebook-based vector quantization generally begins with vectorization of a video stream by breaking the stream into smaller chunks of 1s and 0s (i.e., vectors) and then comparing each input vector to vectors of a given codebook to find a closest match. The index of the entry in the codebook providing the closest match to the input vector can then be used to represent that input vector. Additionally, a residual vector may be generated which represents a mathematical difference between the given input vector and the most similar codebook vector. The residual vector, paired with the codebook index, allows for lossless compression. Once coded, the content can be more efficiently stored and transmitted (i.e., use less storage space and transmission bandwidth), since only the indexes and residuals are stored and transmitted rather than the longer vectors.

For codebook-based compression schemes, such as VQ, the quality and degree of compression achieved is, at least to some extent, dependent of the representativeness of the codebook with respect to the input content to be compressed. To this end, codebooks used in such compression schemes are typically trained across multiple videos or channels over a period of time. The channels are generally controlled by a given content provider. The so-trained codebooks can then be used for compressing new data in those channels.

In any case, because the content is stored in the cloud-based DVR, the user doesn't need to have the content maintained in a storage local to the playback device. As will be further appreciated, because compression makes the given digital file smaller (i.e., fewer bits), that file can be stored using less memory space and transmitted faster, relative to storing and transmitting that file in its uncompressed state.

However, there are a number of non-trivial problems associated with cloud-based DVR services. One such problem is related to the legal requirement that each user's recordings stored in the cloud DVR must be a distinct copy associated with that user only. In another words, even though multiple users have recorded the same program (some piece of digital content), the cloud DVR service provider is required to save a single copy of that program for each of those users. Thus, a storage-conserving technique such as data deduplication, which avoids content storage redundancy by leveraging a common copy of content that is accessible to all users by operation of a pointer-based system, is unacceptable where the one copy per user requirement applies. This requirement of a single copy per user is based in copyright laws related to the right of an individual to legally record content for purpose of time-shifting the personal viewing of that content. Thus, a content service provider that is tasked with providing the same content item to multiple users may still be constrained from a storage perspective and may particularly benefit from improved compression schemes.

DETAILED DESCRIPTION

Figure 1:
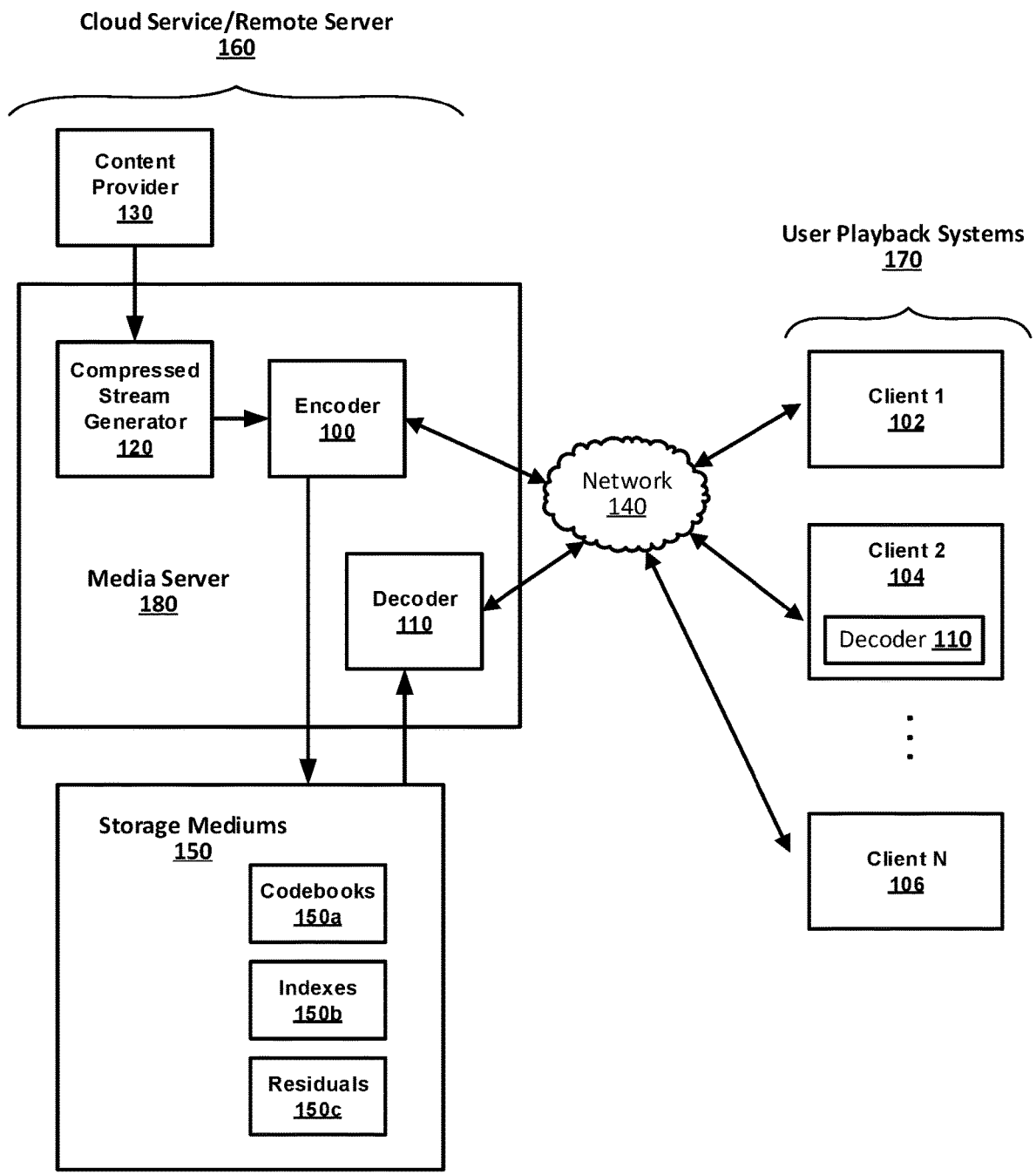
FIG. 1 illustrates a top level block diagram of an example video content streaming system configured in accordance with an embodiment of the present disclosure.

There are instances where it is desirable to apply multiple compression techniques to the digital content of a video stream in order to achieve a required level of compression of the video stream. For example, MPEG compression may be applied to the video stream as an initial operation, generating a pre-compressed video stream, followed by codebook-based vector quantization (VQ) to provide additional compression. However, problems may arise when VQ compression is applied to a pre-compressed video stream. The pre-compression, whether based on MPEG or other existing techniques, typically employs an entropy coding operation in one of the final stages to improve compression efficiency. This entropy coding removes structure that would otherwise be present in the video stream data (e.g., coefficients, motion vectors, etc.). The subsequent VQ compression relies on the existence of such structure in the video stream data to achieve compression, by removing or otherwise exploiting correlations in the data that are associated with that structure. Thus, the compression efficiency of conventional VQ compression techniques may be degraded when applied to pre-compressed video that has undergone entropy coding.

Furthermore, conventional VQ compression employs a vector codebook which serves as a type of dictionary configured to map vectors extracted from the input video stream to relatively smaller values to further the goal of compression. For example, a vector extracted from the input video stream may be matched to a closest vector in the codebook and thus the index value of that closest vector may be used as a substitute for the vector itself. The index value in some cases may simply be the sequentially numbered entry of the closest matching vector in the codebook, and will therefore typically be much smaller than the original vector extracted from the input video stream. The VQ codebook is generally created through a training process in which vectors are extracted from training video streams that are representative, to at least some degree, of the types of video streams for which VQ compression will be desired. The vectors extracted from the training video are then typically clustered into groups and a single vector is chosen from each group, as most representative of that group, for inclusion in the codebook. The degree of VQ compression depends, however, on the quality of the vectors in the codebook. In general, codebook vectors with greater length and structure provide better matches to the vectors extracted from the input video stream and enable greater removal of redundancy, thus providing better compression.

To this end, and in accordance with an embodiment of the present disclosure, techniques for VQ compression are disclosed that address the challenges presented by pre-compression of the input video stream. In particular, an entropy decoding operation is performed on the pre-compressed video stream to reverse the effects of the entropy coding stage of the pre-compression process and restore structure that may have been lost. In some embodiments, the entropy decoding may include, for example, one of the following: Context Adaptive Arithmetic decoding, Context Adaptive Variable Length decoding or Huffman decoding.

Additionally, techniques are disclosed for the generation of improved VQ codebooks that provide codebook vectors of increased length and structure to achieve greater compression efficiency. The increased length codebook vectors are formed by grouping together components, of a common type, from each block of the video stream. These components may include, for example, image data segments, motion data segments and control data segments. In the case of an MPEG pre-compressed video stream, for example, the blocks are Macroblocks and the image data segments are Discrete Cosine Transform (DCT) blocks associated with the Macroblock, the motion data segments are motion vectors associated with the Macroblock and the control data segments are Macroblock flags and/or headers. In such case, the DCT blocks may be grouped together to form one vector, the motion vectors may be grouped to form another vector, and the Macroblock flags/headers may be grouped to form yet another third vector for the codebook, as will be explained in greater detail below.

System Architecture

FIG. 1 illustrates a top level block diagram of an example video content streaming system configured in accordance with an embodiment of the present disclosure. As can be seen, the system is implemented in a client-server architecture, including a number of client nodes 102, 104, 106 (user playback systems 170) communicatively coupled to a cloud service/remote server 160 via a communication network 140. Such a client-server embodiment may be suitable, for example, for use in the context of an online or cloud-based DVR service that allows a subscriber or other user (client) to record and store video content to a remote DVR (server) for subsequent playback at a time suitable to the user. In this example embodiment, the content provider 130 provides video content to a media server computer system 180. The media server computer system 180 is programmed or otherwise configured with a standard compressed video stream generator 120, an encoder 100 and a decoder 110, as will be described in greater detail below. The compressed stream generator 120 may be configured to provide a first level of compression, for example MPEG compression, prior to the application of codebook-based VQ compression by encoder 100.

The storage mediums or storage facilities in the example case depicted include storage for VQ codebooks 150a, codebook indexes 150b and residuals 150c. Although the storage mediums are shown as separate, they need not actually be separate. In still other embodiments, the storage mediums may be implemented with a distributed database that is accessible to the content provider's media server. Likewise, while one media server is shown, any number of media servers can be used to execute the various functionalities provided herein. In a more general sense, numerous cloud-based back-end configurations can be used to implement typical content provider functionality, which can be supplemented with the compression techniques provided herein.

In some embodiments, the encoded media data may be decoded, on demand from the client, by decoder 110 in the media server computer 180 prior to transmission over network 140 to the client-based playback systems 170 (e.g., client 102). In other example embodiments, the client-based playback system 170 may include decoder 110 (e.g., client 104), so that the encoded media data may be directly transmitted over network 140 to take advantage of the compression-based savings with respect to bandwidth and transmission time. In these embodiments, however, the codebook would also need to be provided to the clients.

In operation, the content provider receives a request to record video content from a user via one of the client-based playback systems and the network. The video content requested for recording may be, for example, a scheduled broadcast or an on-demand purchase. In any case, the content provider generates the compressed video stream using the stream generator and may then initiate streaming of the content according to the scheduled broadcast or otherwise at the requested time. In one example case, the compressed video stream is an MPEG-compressed video stream, although any number of compression schemes suitable for streaming video can be used.

In addition to this conventional streaming activity carried out by the content provider, the content provider further acts to process the user's request to record a copy of the content on the user's cloud DVR or other dedicated storage space available for such user requests. To this end, the compressed video stream is processed through the encoder 100 to generate media data for storage in the storage medium 150 (user's cloud DVR), according to an embodiment of the present disclosure. The encoding process carried out by the encoder 100 can be implemented, for example, using any of the variations provided herein as will be appreciated in light of this disclosure. The stored media data can be encoded as optimized residual vector data using codebook-based vector quantization, wherein the codebooks are generated using techniques provided herein.

In response to a request for playback of video content stored in the user's cloud DVR, the media server is further configured to decode the encoded optimized residual vector data back into the compressed video stream and transmit it to the user over the network. The decoding process carried out by the decoder 110 can be implemented, for example, using any of the variations provided herein as will be appreciated in light of this disclosure. The decoder 110 may use the codebooks stored in codebook storage 150a which may be updated periodically (e.g., during off-hours).

In some embodiments, in response to a request for playback of video content stored in the user's cloud DVR, the media server may be configured to stream the encoded optimized residual vector data to the user over the network. The decoder 110 at the user's playback system can then be used to decode the encoded optimized residual vector data back into the compressed video stream, and present that stream to the user via a display. The decoder 110 may use copies of the codebooks stored in codebook storage 150a which may be updated periodically (e.g., during off-hours) and transmitted from the server to the clients.

The user's client can be implemented with any suitable computing device (e.g., laptop, desktop, tablet, smartphone, etc.) or other playback system (e.g., television and set-top box arrangement, monitor and game console arrangement, etc.). The network may include, for instance, a local area network (LAN) operatively coupled to the Internet, or a cable network, or a satellite network, or any other communication network over which video content can be transmitted. The media server can be implemented with one or more server computers configured to receive and process user requests and to provision content. The storage mediums can be any suitable non-volatile storage.

Figure 2A:
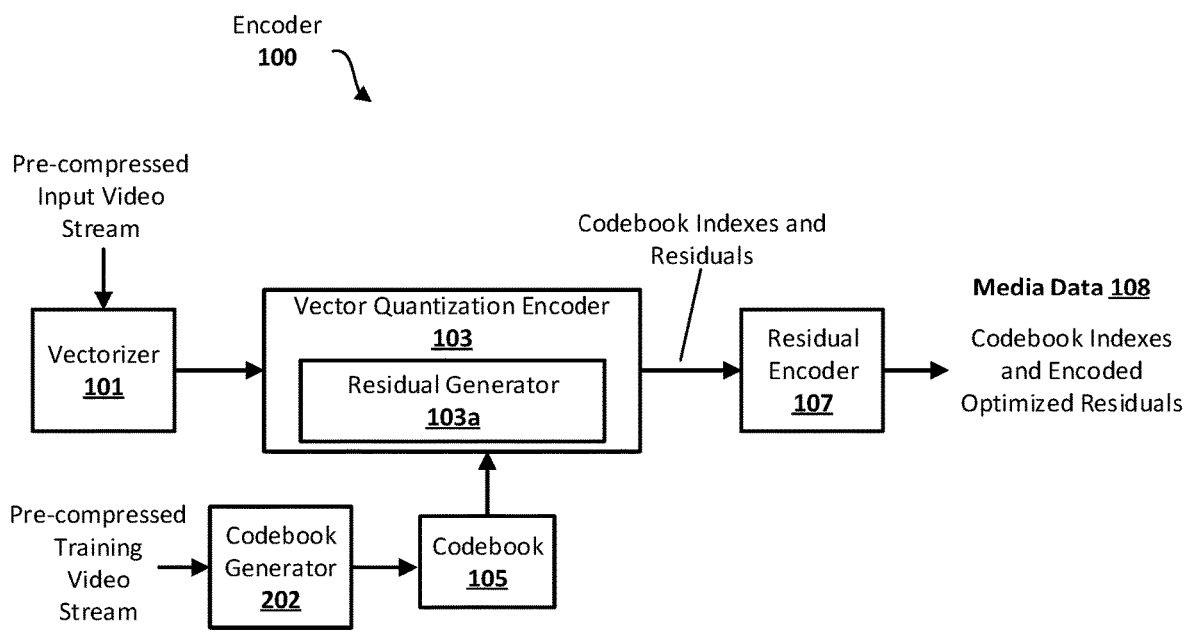
FIG. 2a illustrates a block diagram of an encoder configured in accordance with an embodiment of the present disclosure.

FIG. 2a illustrates a block diagram of an encoder 100 configured in accordance with an embodiment of the present disclosure. As can be seen, the encoder 100 includes a vectorizer 101, a vector quantization encoder 103, a codebook 105, and a residual encoder 107. The vector quantization (VQ) encoder 103 includes a residual generator 103a. Additionally, a codebook generator 202 is provided to generate codebook 105. At a high level, the encoder 100 is configured to receive a pre-compressed input video stream (e.g., an MPEG compressed version of the video stream from the content provider 130) and to output media data 108 that generally includes encoded optimized residuals and corresponding codebook indexes. This output can be stored for multiple users, such that there is one distinct copy of media data 108 per user. In some embodiments, only a portion of the media data 108 is subject to the one copy per user requirement. For instance, in one such example case, only the codebook index is stored multiple times (one distinct copy per user) and the optimized residual is stored only once. Other variations of a one copy per user scheme that may be compliant with the relevant applicable standards and legal requirements can be used as well. In addition, the encoder 100 may also provide metadata which can be stored as a single copy, along with the codebook 105, so that they are available for decoding the optimized residuals prior to transmission or at the playback node, as will be explained in turn. The metadata may identify or otherwise include data that facilitates decoding of the encoded optimized media. In one embodiment, for instance, the metadata identifies the total number of dimensions in the un-optimized residual vector and the length of each non-zero dimension, along with other data useful in the decoding process, such as the length of the corresponding codebook index, the total length of the residual vector (including all dimensions, both zeros and non-zeros) and the codebook identifier (assuming there is more than one codebook).

Other embodiments may be configured differently but still provide a similar functionality. For instance, in another embodiment, the vectorizer 101 may be integrated with the VQ-encoder 103. Likewise, the residual encoder 107 may be integrated with the VQ-encoder 103. The degree of integration can vary from one embodiment to the next. Further note that, in some embodiments, encoding can take place on a transmitting (content provider) node and decoding can take place on the receiving (playback) node, such that an encoded compressed video stream is transmitted. Alternatively, encoding and decoding may both take place at the transmitting node, so that a normal (not encoded) compressed video stream is transmitted. Numerous variations will be apparent and the present disclosure is not intended to be limited to any particular one.

The vectorizer 101 may be configured to break the input pre-compressed video stream into vectors that are suitable for matching to the vectors in codebook 105. As such, the vectorizing process is similar to the process used to generate the codebook and will be described in greater detail below in connection with the codebook generation process 202 and FIG. 7. In one example embodiment, vectorizer 101 is configured to receive an MPEG-compressed input video stream. As will be appreciated, MPEG compression is used herein in a generic fashion, and is intended to include all typical use cases, including those where the audio and video of a given media file is compressed by one of the standards that the Moving Picture Experts Group (MPEG) has promulgated (such as MPEG-1, MPEG-2, or MPEG-4) and multiplexed using the MPEG-2 transport stream standard. However, as will be further appreciated in light of this disclosure, any ISO (International Organization for Standardization) or ITU (International Telecommunication Union) standard, or other such standards, can be used instead of MPEG and the stream may or may not be multiplexed. So, in a more general sense, the vectorizer 101 can be configured to receive any type of pre-compressed video stream, regardless of the compression standard used.

The vectors generated by the vectorizer 101 are provided to the VQ-encoder 103, which carries out the vector quantization process on those vectors. Vector quantization is a lossy compression scheme used to encode/decode MPEG video streams, and is generally implemented by mapping input vectors from a given multidimensional input space into a smaller dimensional subspace using a set of representative code vectors maintained as a codebook. Such a vector codebook can be trained to improve its representativeness of the digital content being compressed, as will be explained below. Thus, by virtue of encoding values from a multidimensional vector space into a finite set of values of a discrete subspace of lower dimension, the vector quantization process carried out by the VQ-encoder 103 allows for a relatively large data set to be fairly well represented by a smaller data set and hence compression is achieved. So, with further reference to FIG. 2a, the VQ-encoder 103 identifies the closest representative codebook vector in the given codebook 105 (by way of Euclidean norms of the vectors being compared, or other suitable vector comparison technique). The difference between that selected codebook vector and the input vector (from vectorizer 101) is generated by the residual generator 103a, and this difference is referred to as a residual vector. The residual vector can then be stored or otherwise made available for subsequent processing. This subsequent process generally includes optimizing and entropy coding the residual vector to further increase compression, as will be explained in turn. Further note that the index of the corresponding representative codebook vector selected from codebook 105, used to generate that residual vector, can be stored as well. This will allow for retrieval of the same codebook vector from the codebook 105, when decoding is carried out.

Once the residual vector for a given input vector is computed by the VC-encoder 103, that residual vector and corresponding codebook vector index are provided to the residual encoder 107, as shown in FIG. 2a. The residual encoder 107 can implement any number of entropy coding schemes, such as Context Adaptive Arithmetic coding, Context Adaptive Variable Length coding and Huffman coding, to compress the residual vectors. The reference to entropy refers to the notion that the residual vectors tend to have lower entropy than the original vectors received in the vectorized compressed video stream (from vectorizer 101), because logical 0s and low value dimensions tend to have high probabilities and high dimension values tend to have low probabilities.

A zero removal process by the residual encoder 107 provides an optimized residual vector. So, for instance, given a residual vector of {4 1 0 0 0 5 0 0 1 −2 0} from VQ-encoder 103, the optimized version of that residual vector would be {4 1 5 1 −2}. Because metadata may be stored and made available to the decoding process, the entropy coding scheme can be optimized and the coding tables can be smaller. So, for instance, and continuing with the previous example residual vector of {4 1 0 0 0 5 0 0 1 −2 0}, the optimized version of that residual vector would be {4 1 5 1 −2}. Applying decimal-to-binary conversion, the resulting optimized residual would be {100 1 101 1 10}. The dimension signs and lengths can be recorded into metadata. In some embodiments, this binary value {100 1 101 1 10} can then be used as an index or key into a Huffman table to find the corresponding Huffman code. Alternatively, each of the five dimensions can be treated as five input symbols presented for standard Arithmetic coding.

Figure 2B:
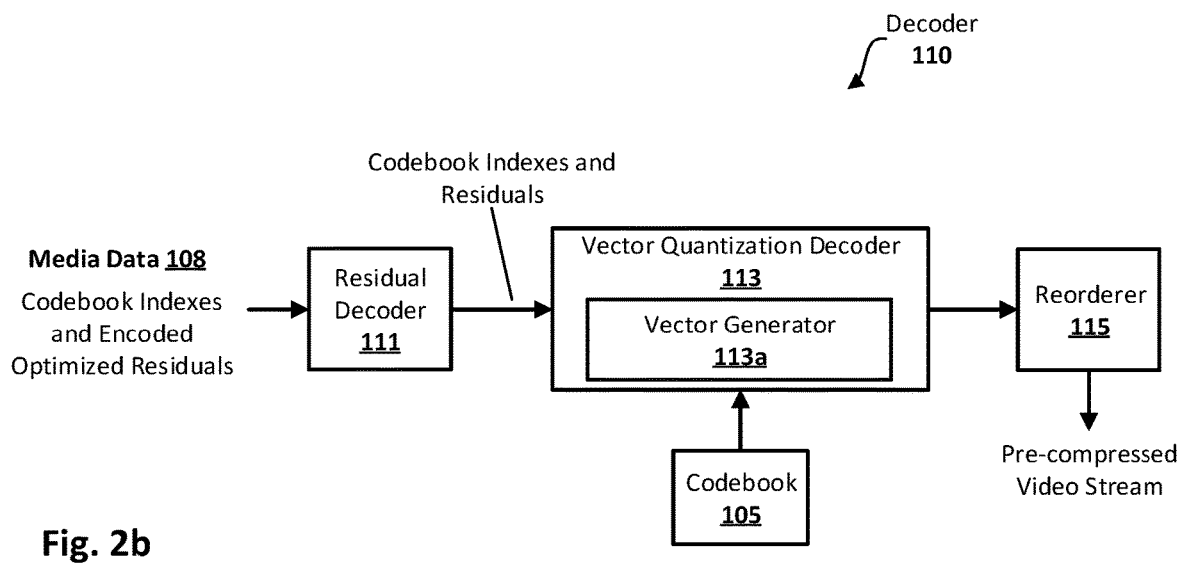
FIG. 2b illustrates a block diagram of a decoder configured in accordance with an embodiment of the present disclosure.

FIG. 2b illustrates a block diagram of a decoder 110 configured in accordance with an embodiment of the present disclosure. As will be appreciated, the decoder 110 provides functionality that is complementary to the encoder 100, and to this end discussion with respect to decoding is kept concise and the previous relevant discussion regarding the encoder 100 is equally applicable here. As can be seen in FIG. 2b, the decoder 110 includes a residual decoder 111 (complementary to residual encoder 107), a vector quantization (VQ) decoder 113 (complementary to VQ-encoder 103), codebook 105 (which is the same), and a reorderer 115 (complementary to vectorizer 101). The VQ-decoder 113 includes a vector generator 113a (complementary to residual generator 103a). Further note that the decoder 110 may actually be on the same node as the encoder 100, such as in applications where the compression techniques provided herein are being used to improve storage efficiency rather than transmission speed. However, in other embodiments, the decoder 110 can be implemented at a receiving node remote to the transmitting node, such that storage efficiency at the transmitting node as well as faster transmission speed from the transmitting node to the receiving node may be achieved if so desired.

At a high level, the decoder 110 is configured to receive media data 108 that generally includes encoded optimized residuals and corresponding codebook indexes, and to output a compressed video stream suitable for playback (after reversing the pre-compression, e.g., MPEG compression). The received media data 108 is for a specific user, such that there is one distinct copy of media data 108 per user. However, and as previously explained, in some embodiments, only a portion of the media data 108 is subject to the one copy per user requirement (e.g., the codebook index may be stored multiple times, once per user, and the optimized residual is only stored once). The decoder 110 may also receive metadata which, as previously explained, can be stored as a single copy, along with the codebook 105, so that it is available for decoding the optimized residuals. So, for instance, let's continue with the previous example optimized residual of {100 1 101 1 10} that was generated by the encoder 100, as previously explained. Using the metadata, the residual decoder 111 decodes the encoded version of this optimized residual to {4 1 5 1 −2} in accordance with the given entropy coding scheme (and binary-to-decimal conversion, in this example case). In this case, the metadata could indicate the dimensions having a negative polarity. Also known from the metadata, according to an embodiment, is the total number of dimensions of the residual vector, as well as the length and location of non-zero dimensions of the residual vector. Thus, with this information in hand, the residual decoder 111 further decodes {4 1 5 1 −2} to {4 1 0 0 0 5 0 0 1 −2 0}, which is the original residual vector. Once the corresponding codebook vector is retrieved using the given codebook index, the vector generator 113a of the VQ-decoder 113 recovers the original vector (or a relatively close representation of that original vector) by adding the original residual vector to the retrieved codebook vector. The recovered vectors are provided by the VQ-decoder 113 to the reorderer 115 which operates to re-combine the vectors to form the original pre-compressed video stream (or a relatively close representation thereof). The operations of the reorderer 115 will be described in greater detail below in connection with FIG. 8. In one example embodiment, reorderer 115 is configured to receive a stream of discrete vectors having a known length and to combine those vectors into an MPEG-compressed video stream, although other compression standards can be used as well.

As will be further appreciated in light of this disclosure, the various modules and components of the encoder 100 and decoder 110, such as the vectorizer 101 and reorderer 115, VQ-encoder 103 and VQ-decoder 113, residual encoder 107 and residual decoder 111, and codebook generator 202 can be implemented in software, such as a set of instructions (e.g. C, C++, object-oriented C, JavaScript, BASIC, etc.) encoded on one or more non-transitory computer readable mediums (e.g., hard drive, solid-state storage, server, or other suitable physical memory), that when executed by one or more processors, cause the various methodologies provided herein to be carried out. A computer program product may include any number of such computer readable mediums, and may be distributed in nature. For instance, functional modules of the encoder 100 can be implemented on a cloud-based server or other suitable computing environment, and the functional modules of the decoder 110 can be implemented on a client-based computing device or suitable playback platform (e.g., television, laptop, projection system, smartphone, tablet, desktop, etc.). In other embodiments, the components/modules may be implemented with hardware, such as gate level logic (e.g., FPGAs) or a purpose-built semiconductor (e.g., ASICs), which may also be distributed in some embodiments. Still other embodiments may be implemented with one or more microcontrollers (distributed or not) each having a number of input/output ports for receiving and outputting data and a number of embedded routines for carrying out the functionality described herein. Any suitable combination of hardware, software, and firmware can be used.

Figure 3:
FIG. 3 illustrates an example codebook.

FIG. 3 illustrates an example codebook 105. The codebook is generated by codebook generator 202 from a training video stream, as will be described below. In some embodiments, codebook 105 may be relatively static in nature, such that it is previously trained on a relevant set of content channels of the content provider 130 and then deployed for use by the encoder 100 (and decoder 110). In other embodiments, the codebook 105 may be more dynamic in nature where updating of the codebook representative code vectors is an ongoing process using additional content channels for continued training. The example codebook 105 is shown to include index values 302 and associated N vector entries 304, each vector comprising a number of dimensions or elements. Note that the size (and hence, resolution) of the codebook can vary greatly from one embodiment to the next. In a general sense, the greater the resolution of the codebook 105 (i.e., the higher the number of distinct indexed codebook vectors, N), the greater the representativeness of the targeted multidimensional space (video content library of service provider) being subjected to vector quantization. The greater the representativeness of the targeted multidimensional space, the smaller in value the residual vectors will be. Said differently, the more representative a given codebook vector is of a given input vector, the lower the number of non-zero dimensions or elements are in the resulting residual vector. The lower the number of non-zero dimensions in the resulting residual vector, the fewer the number of bits required to store it (e.g., zero removal) and thus the greater the degree of compression that can be applied to that residual. Zero removal may also typically improve entropy coding efficiency.

Figure 4:
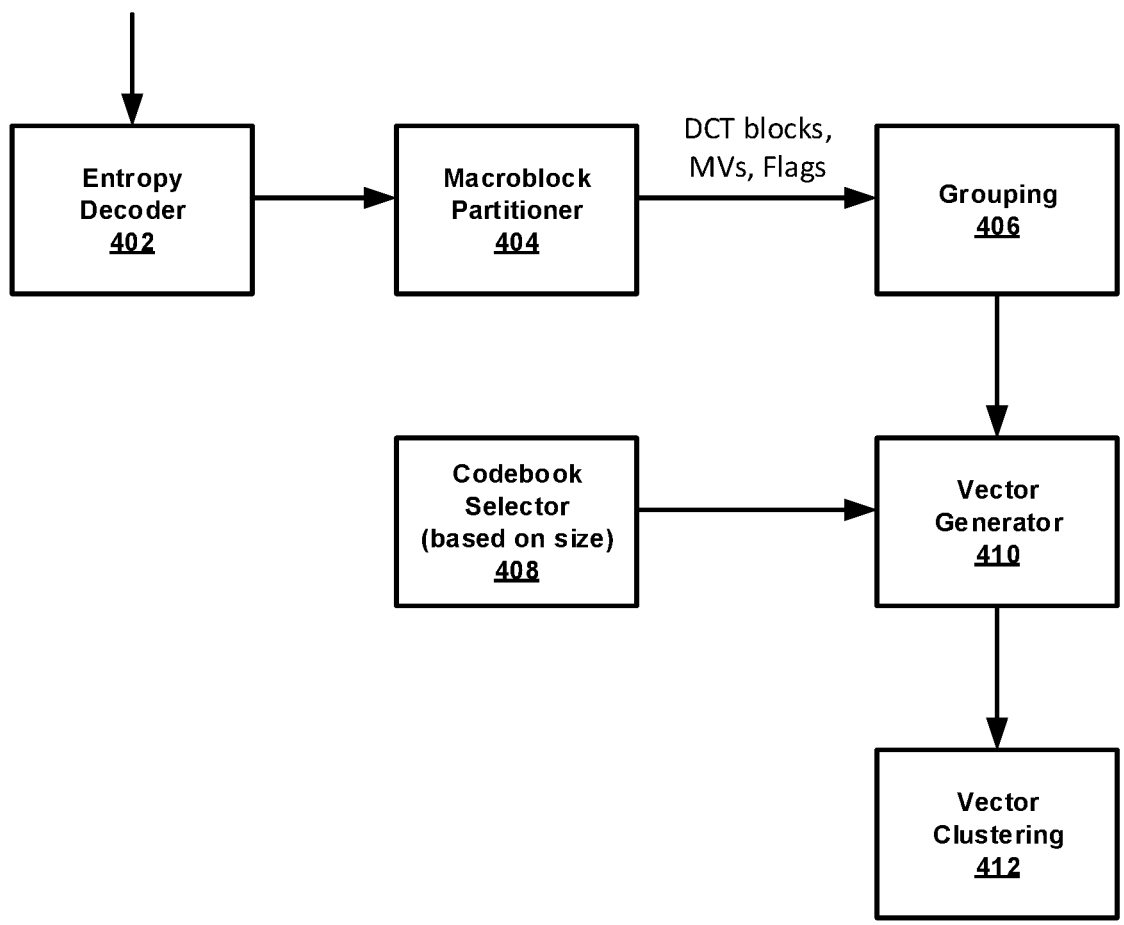
FIG. 4 illustrates a block diagram of a codebook generator configured in accordance with an embodiment of the present disclosure.

FIG. 4 illustrates a block diagram of the codebook generator 202, from FIG. 2a above, configured in accordance with an embodiment of the present disclosure. The codebook generator 202 is shown to include an entropy decoder 402, a Macroblock partitioner 404, a grouping module 406, a vector generator 410, a codebook selector 408, and a vector clustering module 412. Taken together, these various modules provide techniques for codebook generation based on pre-compressed training video streams. The techniques include the formation of relatively longer codebook vectors by grouping together components, of a common type, for each block of the pre-compressed training video streams, as will be explained in greater detail below. The resulting longer vectors have higher dimensions and greater structure which improve the ability of vector quantization to remove redundancy and thus increase compression efficiency.

The training video streams may be provided by content provider 130, or any other suitable source, with compression (e.g., MPEG compression) applied by compressed stream generator 120 in a manner similar to that of the pre-compressed input video stream, provided to vectorizer 101, as described above. The training video stream or streams include digital content that is representative of what will be provided in the pre-compressed input video stream, so that the resulting codebook will be representative of the input vectors generated by vectorizer 101 from the pre-compressed input stream. The more representative the codebook is of the input vectors, the smaller in magnitude the residual vectors will tend to be, potentially requiring fewer bits to represent those vectors and thus improving compression efficiency.

The entropy decoder 402 may be configured to perform entropy decoding on the pre-compressed training video stream to provide a decoded video stream for codebook generation. In other words, the entropy decoder reverses the effect of the final entropy coding stage of the preliminary compression (e.g., MPEG compression) that may be applied by compressed stream generator 120 on the training video stream, in the same manner that such preliminary compression is performed on the input video stream.

Reversal of the entropy coding restores the structure and correlation that was originally present in the data (e.g., quantized coefficients and motion vectors of an MPEG compressed stream) prior to entropy coding. This results in a codebook that may provide improved hits or matches between the vectors generated from the input video stream (by vectorizer 101) and the vectors in the codebook. Closer matches may result in smaller residuals requiring fewer bits and thus better VQ compression. In some embodiments, the entropy decoding may include, for example, one of the following: Context Adaptive Arithmetic decoding, Context Adaptive Variable Length decoding, Huffman decoding or any other suitable decoding scheme.

The Macroblock partitioner 404 may be configured to partition the decoded video stream into image data segments, motion data segments and control data segments. In one such embodiment, for example where the training video stream is an MPEG-compressed video stream, the image data segments may be Discrete Cosine Transform (DCT) blocks associated with a Macroblock, the motion data segments may be motion vectors associated with the Macroblock, and the control data segments may be Macroblock flags or headers or other relevant information. This is illustrated in greater detail, for example in FIG. 5, which shows how an MPEG-2 transport stream 502 is hierarchically organized into levels.

Figure 5:
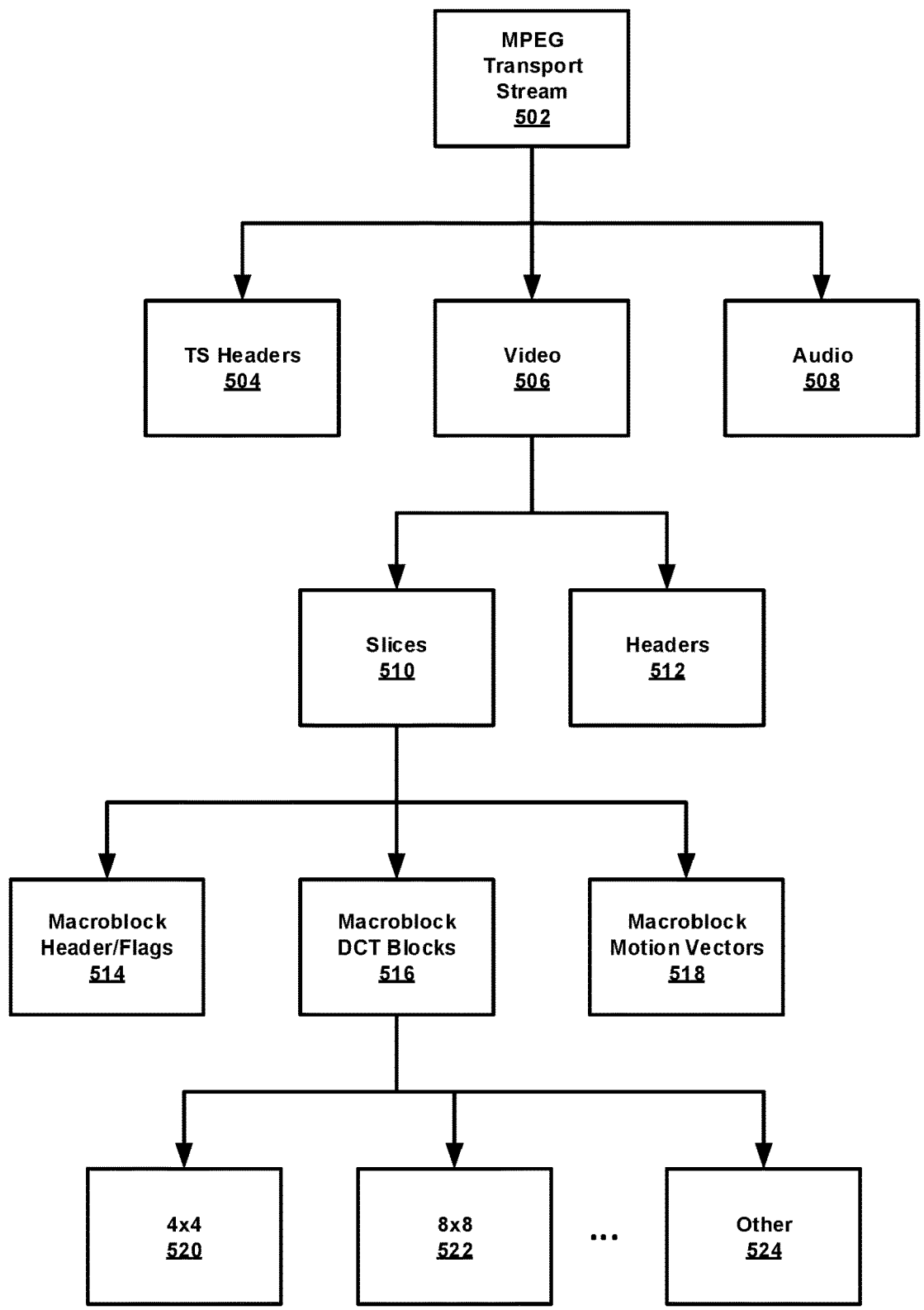
FIG. 5 illustrates the partitioning of an MPEG-2 transport stream in accordance with an embodiment of the present disclosure.

Referring to FIG. 5, at the top level the transport stream is demultiplexed into headers 504, video 506 and audio 508. The video in turn may be further parsed into slices 510 and associated headers 512. Each slice 510 may be further partitioned into one or more Macroblocks that include headers/flags and other control data 514, DCT blocks 516 and motion vectors 518. The DCT blocks 516 may come in different sizes, for example 4×4 blocks 520, 8×8 blocks 522 and other sizes 524, including DC or 1×1 values. The DCT blocks generally encode information describing a color image at a particular point in time while the motion vectors generally encode a prediction of how the image will move from one point in time to another.

The grouping module 406 and vector generator 410 may be configured to group the partitioned segments of each type (typically within a single macroblock) together to form vectors. For example, the image data segments (DCT blocks) are grouped to form a first vector, the motion data segments (motion vectors) are grouped to form a second vector, and the control data segments (Macroblock flags/headers) are grouped to form a third vector. Thus, the resulting first vector is longer than any one of the image data segments from which it is formed. Similarly, the resulting second vector is longer than any one of the motion data segments from which it is formed and the resulting third vector is longer than any one of the control data segments from which it is formed. This is illustrated in greater detail, for example in FIG. 6, which shows how MPEG stream components may be grouped into vectors.

Figure 6:
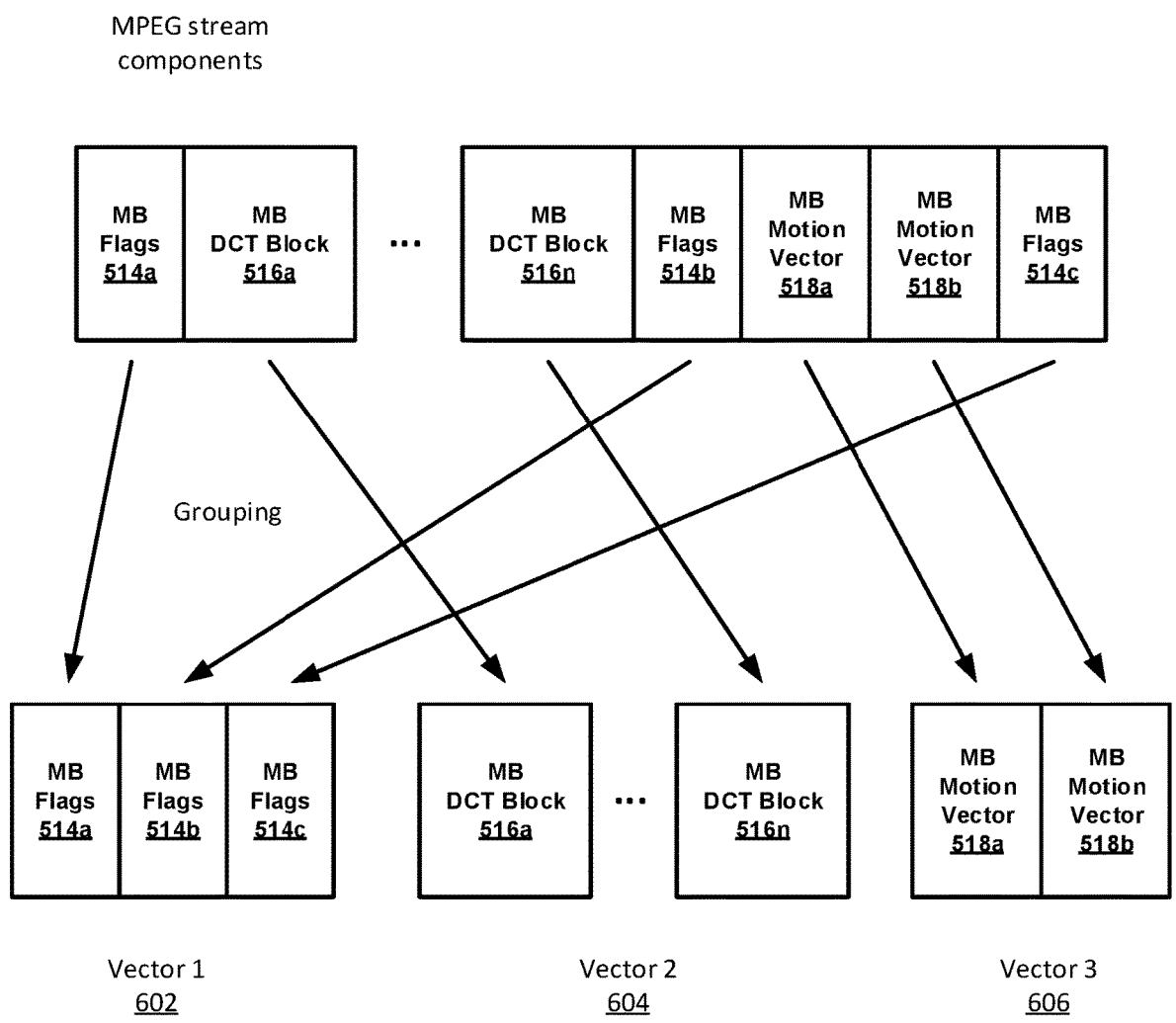
FIG. 6 illustrates the grouping of stream components for vector generation in accordance with an embodiment of the present disclosure.

In FIG. 6, the partitioned Macroblock (MB) flags 514*a*, 514*b*, 514*c* are grouped to form a first vector 602. Similarly, the partitioned MB DCT blocks 516*a*, . . . 516*n* are grouped to form a second vector 604 and the partitioned MB motion vectors 518*a*, 518*b* are grouped to form a third vector 606. In some embodiments, only contiguous fields in the Macroblock (e.g., x-axis motion vectors and y-axis motion vectors) are grouped together to form larger vectors. All flag data from a single Macroblock may generally be grouped together, however, to form a larger vector, even when not contiguous (e.g., interleaved with other fields).

In some embodiments, different codebooks may be generated depending on the type and size of the partitioned segments. For example, and with reference to MPEG streams, 8×8 DCT blocks may be mapped to one codebook while 4×4 DCT blocks may be mapped to a different codebook. Likewise, larger motion vectors and smaller motion vectors may be mapped to different codebooks. The codebook selector 408 may be configured to determine which codebook a given vector will be mapped to, based on a comparison to a selected size threshold. The mapping to different codebooks may vary as the stream is being processed since DCT block sizes and motion vector sizes may vary throughout the stream.

In some embodiments, vector generator 410 may be further configured to determine the size of the data associated with each Macroblock, and, if the size is less than a selected threshold size, form a single vector from the combination of the DCT blocks, motion vectors and flags of that Macroblock. The application of a size threshold may avoid the combination of different types of vectors which might not yield the best results if combined in a single codebook. In other words, if the Macroblock is smaller than the threshold size, the decoded values of the entire Macroblock are used as the dimensions or elements of a single codebook vector. This may provide improved vector quantization where Macroblock components (e.g., DCT blocks and motion vectors) are in the range of approximately 8 bits or less.

The size of the generated codebook 105 is typically limited by a desire to maintain the length of the indexes to a relatively small value to conserve space since these indexes are stored or transmitted as part of the VQ compressed stream. In some embodiments, indexes may be limited to a range of approximately 7 to 10 bits allowing for a codebook size in the range of 128 to 1024 entries, although other ranges are, of course, possible depending on the application and other constraints.

However, in some embodiments/instances, the total number of vectors that may be generated from a training video stream or streams may be two to three orders of magnitude greater than the codebook can accommodate. Vector clustering module 412 may be configured to select the most representative vectors from all available vectors for inclusion in the codebook. A clustering algorithm may be used to group the available vectors into clusters or segments and find the centroid of those clusters to serve as a representative vector. The clustering algorithm and centroid determination may be implemented using known techniques in light of the present disclosure. Vector clustering module 412 may further be configured to enter each selected or representative vector as an entry into the codebook along with an associated index value, as illustrated in FIG. 3.

Figure 7:
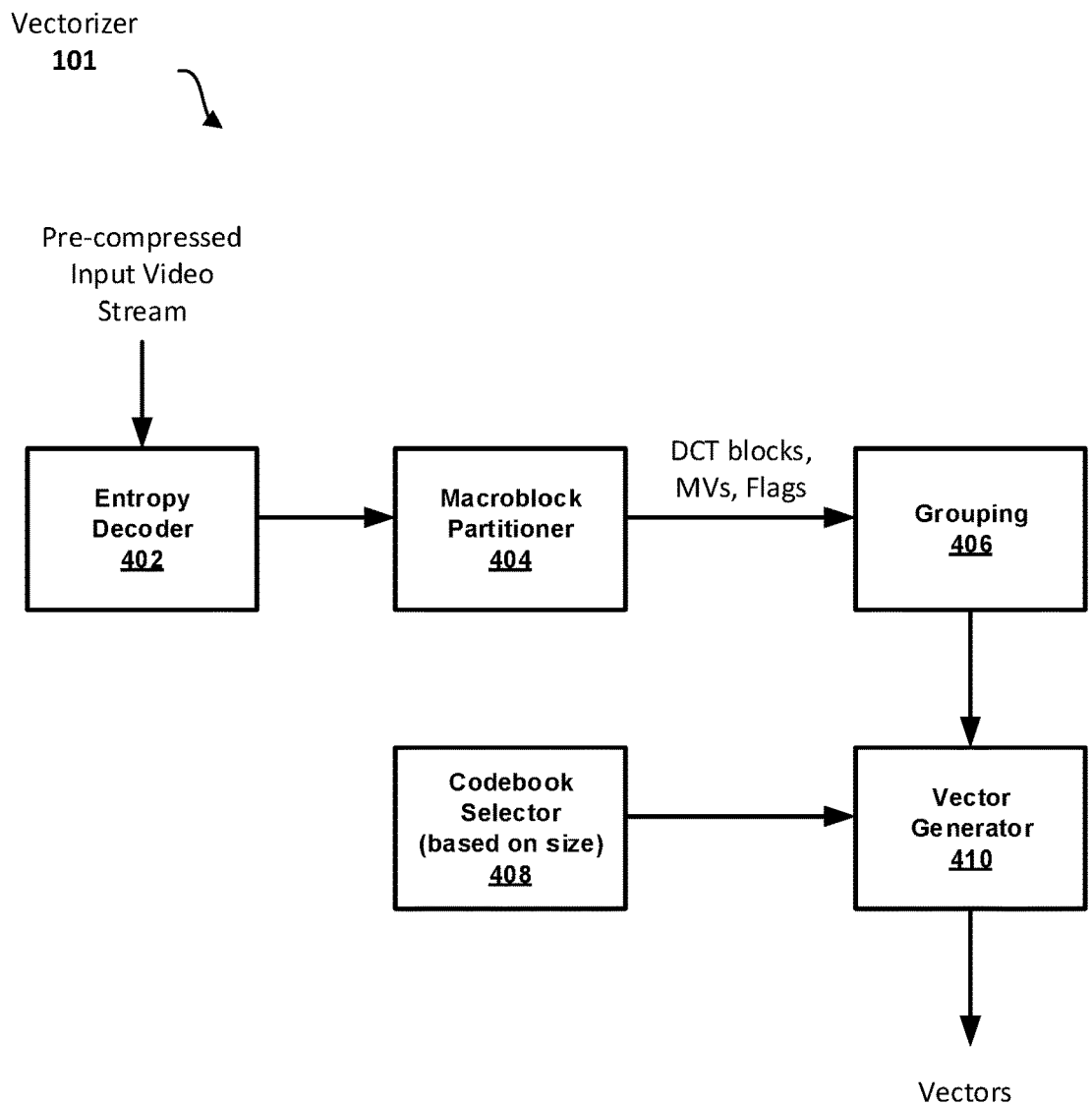
FIG. 7 illustrates a block diagram of a vectorizer configured in accordance with an embodiment of the present disclosure.

FIG. 7 illustrates a block diagram of a vectorizer 101 configured in accordance with an embodiment of the present disclosure. The vectorizer 101, as previously described, may be configured to break the input pre-compressed video stream (e.g., an MPEG stream) into vectors that are suitable for matching to the vectors in codebook 105, which were generated by the techniques described herein. As such, the vectorizing process 101 applied to the input pre-compressed video stream is substantially similar to the process used to generate the codebook vectors from the training pre-compressed video stream. In particular, vectorizer 101 is shown to include the entropy decoder 402, Macroblock partitioner 404, grouping module 406, vector generator 410 and a codebook selector 408, all of which may operate in a substantially identical manner to the corresponding components/modules of the codebook generator 202 illustrated in FIG. 4. The vector clustering and codebook indexing operations 412 of the codebook generator 202 are not, however, included in vectorizer 101 as the vectorizer is configured to generate vectors to be used to find closest matches to codebook entries rather than for the purpose of generating entries for the codebook.

Figure 8:
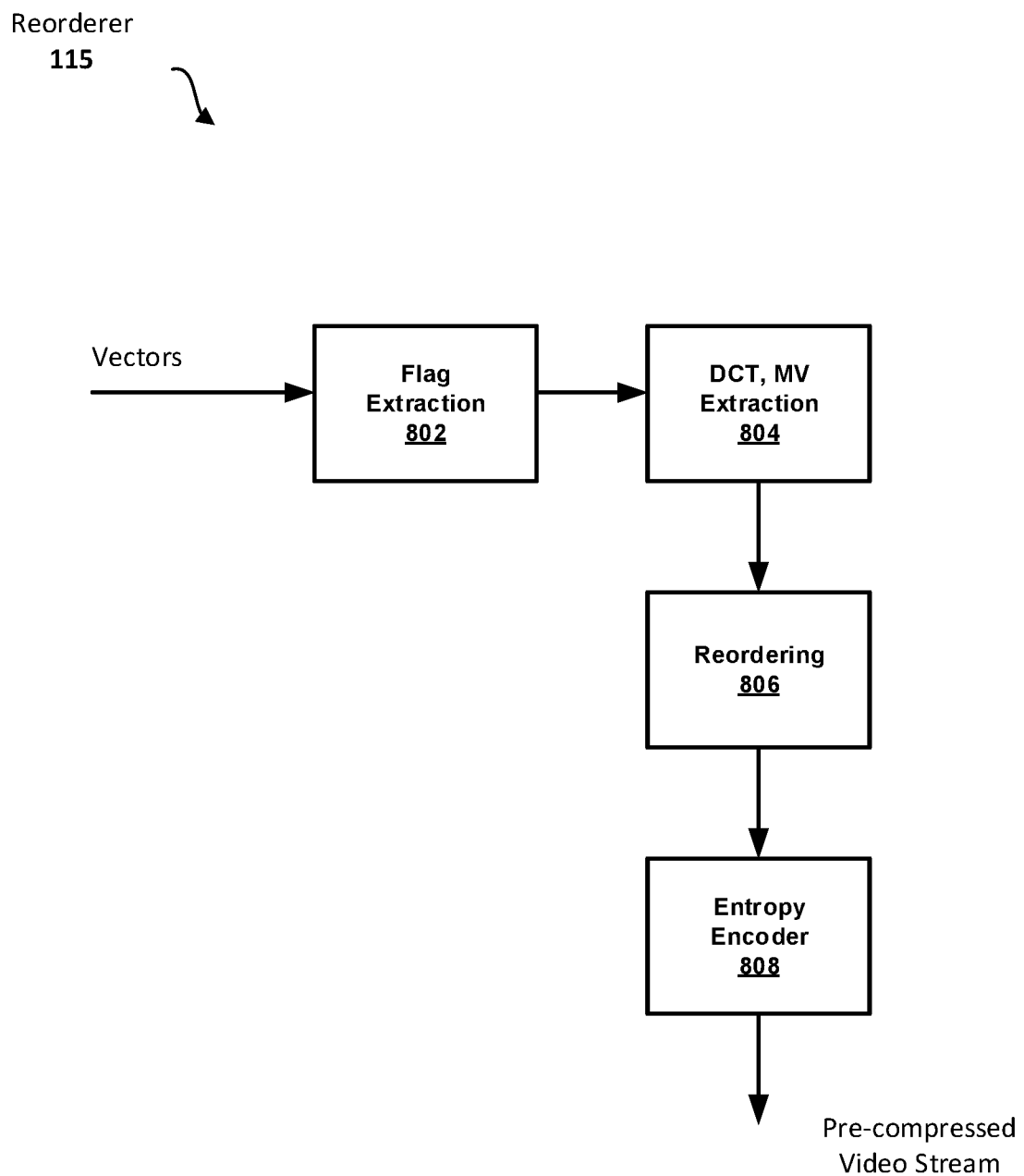
FIG. 8 illustrates a block diagram of a reorderer configured in accordance with an embodiment of the present disclosure.

FIG. 8 illustrates a block diagram of a reorderer 115 configured in accordance with an embodiment of the present disclosure. The reorderer 115, as previously described, may be configured to re-combine the VQ decoded vectors to form the original pre-compressed video stream (or a relatively close representation thereof). In particular, the reorderer 115 is shown to include a flag extraction module 802, a DCT and MV extraction module 804, a reordering module 806 and an entropy encoder 808, which operate together to essentially reverse the operations of vectorizer 101.

The flag extraction module 802 may be configured to extract control data segments (e.g., Macroblock flags, headers, etc.) from the vector. These flags may then be used to locate the remaining components or fields of the Macroblock. In some embodiments, metadata (e.g., providing the lengths and locations of these fields) may also be provided to assist with this operation. DCT and MV extraction module 804 may be configured to extract the image data segments (e.g., DCT blocks) and motion data segments (e.g., motion vectors) from the vectors, based at least in part on the previously extracted flag data and other header/control information.

Reordering module 806 may be configured to reorder the extracted components (e.g., flags, DCT blocks, motion vectors) back into the original ordering of the pre-compressed video stream. In other words, reordering module 806 reverses the operations of Macroblock partitioner 404 and grouping module 406. Flag data (and possibly metadata) may be used to determine the original ordering of the components.

Entropy encoder 808 may be configured to restore the entropy encoding that was previously removed by entropy decoder 402 during the VQ compression process as described earlier.

Methodology

Figure 9:
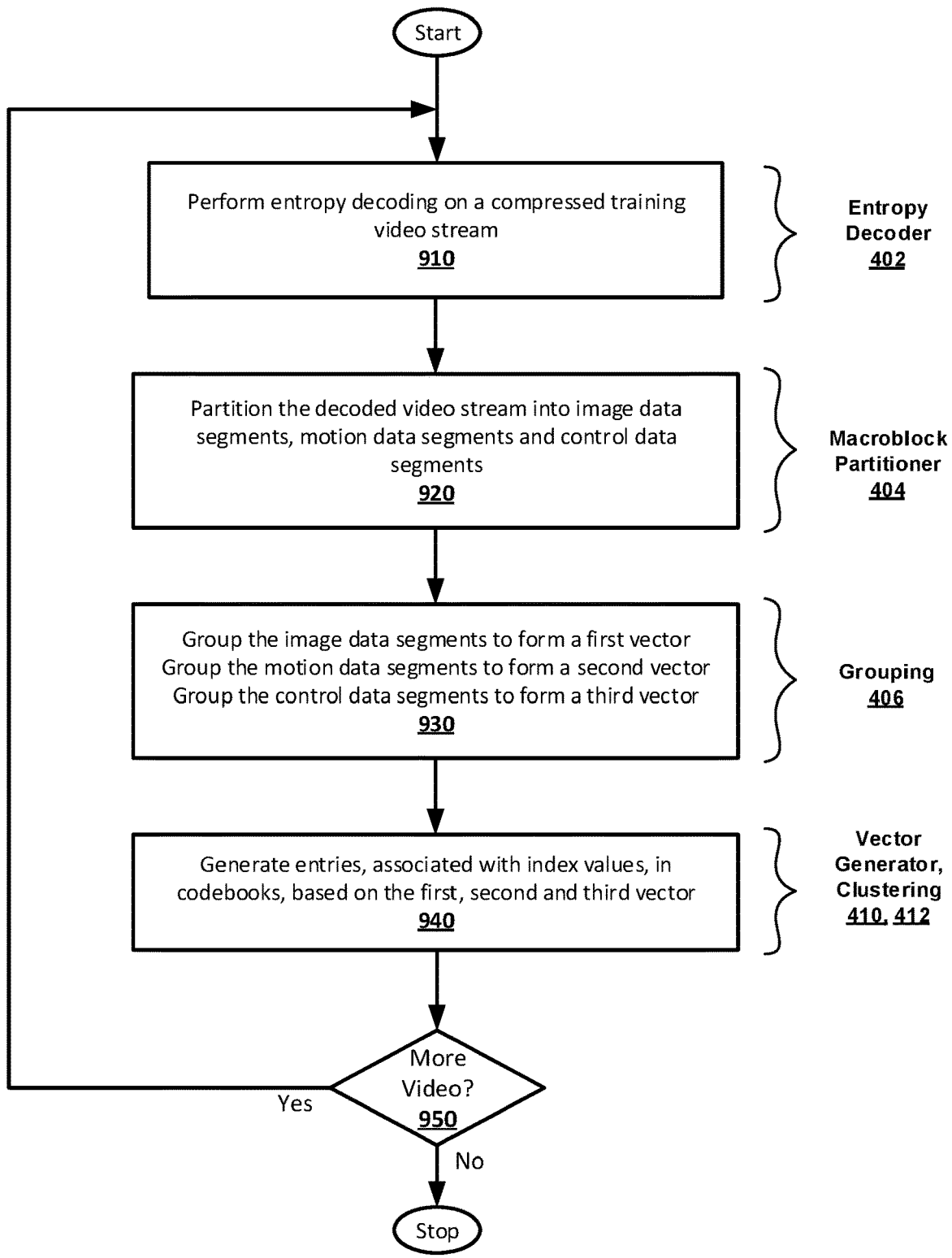
FIG. 9 is a flowchart illustrating a method for codebook generation in accordance with an embodiment of the present disclosure.

FIG. 9 is a flowchart illustrating a method for improved VQ codebook generation in accordance with an embodiment of the present disclosure. As can be seen, the method is described with reference to the configuration of codebook generator 202 of FIG. 4. However, any number of codebook generator configurations can be used to implement the method, as will be appreciated in light of this disclosure. Further note that the various functions depicted in the method do not need to be assigned to the specific example modules shown. To this end, the example methodology depicted is provided to give one example embodiment and is not intended to limit the methodology to any particular physical or structural configuration.

The method commences at 910 with entropy decoding performed on the pre-compressed training video stream to restore structure to the data that may have been lost during a previous entropy coding operation. This operation may be performed by entropy decoder 402. In one example case, the pre-compressed training video stream is an MPEG-compressed video stream, although any suitable compression standard can be used that produces a pre-compressed video stream that can be vectorized, for example a stream that is block based or comprises groupings of pixels. The method continues at 920 with partitioning of the decoded video stream into various segments such as, for example, image data segments, motion data segments, and control data segments. In one such embodiment, for example where the training video stream is an MPEG-compressed video stream, the image data segments may be Discrete Cosine Transform (DCT) blocks associated with a Macroblock, the motion data segments may be motion vectors associated with the Macroblock and the control data segments may be Macroblock flags or headers or other relevant information. This operation may be performed by Macroblock partitioner 404.

Next, at operation 930, the image data segments are grouped to form a first vector, the motion data segments are grouped to form a second vector and the control data segments are grouped to form a third vector. At operation 940, one or more codebook entries, associated with index values, are generated based on these vectors. The index values provide a compressed representation of the entries, as previously described. Note that in some embodiments, different codebook may be generated depending on the size of the partitioned segments. For example, and with reference to MPEG streams, 8×8 DCT blocks may be mapped to one codebook while 4×4 DCT blocks may be mapped to a different codebook. The mapping to different codebooks may occur dynamically as the stream is being processed since DCT block sizes and motion vector sizes may vary dynamically throughout the stream.

Note that the entropy decoding performed at operation 910, to restore or improve data structure in the stream, may result in a more representative codebook that reduces or otherwise minimizes the distortion post-VQ (i.e., the residual vector values). In other words, a codebook may be considered "representative" when the accuracy of the codebook is such that the given codebook vectors tend to be not much different from the given input vectors being subjected to VQ, which in turn yields residual vectors that tend to be smaller in value. In such a scenario, a greater number of the elements (or dimensions) making up a given residual vector tend to be zero with the remainder of the dimensions tending to be a low number. However, there may still be occasional high error magnitudes (i.e., codebooks are generally not perfect, regardless of how well trained they are).

Of course, in some embodiments, additional operations may be performed. For example, if the size of the Macroblock data is less than a selected threshold value, a single vector may be formed by grouping the DCT blocks, the motion vectors and flags into one indexed codebook vector entry. Additionally, due to constraints on the size of the codebook (i.e., total number of entries) a clustering algorithm may be used to reduce the total number of generated vectors by selecting and retaining a subset of the vectors that are most representative, by some suitable measure, of the pre-compressed training video stream.

Example Embodiments

Numerous example embodiments will be apparent, and features described herein can be combined in any number of configurations.

Example 1 includes a method for generating codebooks for vector quantization of digital video content. The method includes: performing entropy decoding on a pre-compressed training video stream to provide a decoded video stream, wherein the pre-compressed training video stream includes entropy coding; partitioning the decoded video stream into segments, the segments including image data segments, motion data segments, and control data segments; grouping the image data segments to form a first vector, wherein the first vector is longer than any one of the image data segments; grouping the motion data segments to form a second vector, wherein the second vector is longer than any one of the motion data segments; grouping the control data segments to form a third vector, wherein the third vector is longer than any one of the control data segments; generating entries in at least one codebook of the codebooks, the entries based on at least one of the first vector, the second vector, and the third vector; and associating an index value with each of the entries, wherein the index value is shorter than the entries such that the index value provides a compressed representation of the entries.

Example 2 includes the subject matter of Example 1, wherein the entropy decoding of the pre-compressed training video stream includes at least one of Context Adaptive Arithmetic decoding, Context Adaptive Variable Length decoding and Huffman decoding.

Example 3 includes the subject matter of Example 1 or 2, wherein the pre-compressed training video stream is an MPEG-compressed video stream.

Example 4 includes the subject matter of any of the previous Examples, wherein the image data segments are Discrete Cosine Transform (DCT) blocks associated with a Macroblock, the motion data segments are motion vectors associated with the Macroblock and the control data segments are Macroblock flags.

Example 5 includes the subject matter of any of the previous Examples, further comprising generating a plurality of codebooks, wherein each of the codebooks is to store vectors associated with DCT blocks and motion vectors of a selected size.

Example 6 includes the subject matter of any of the previous Examples further comprising: determining a size of the Macroblock data; if the size of the Macroblock data is less than a selected threshold size, forming a single vector from the DCT blocks, the motion vectors and the Macroblock flags; and generating an indexed entry in one or more of the codebooks based on the single vector.

Example 7 includes the subject matter of any of the previous Examples, further comprising reducing the number of entries in the codebook by applying a clustering algorithm to the vectors to select and retain vectors that are most representative of the pre-compressed training video stream.

Example 8 includes a computer program product comprising one or more non-transitory computer readable mediums encoded with instructions that when executed by one or more processors cause a process to be carried out for generating codebooks for vector quantization of digital video content, the process comprising the method of any of Examples 1 through 7.

Example 9 includes a system for generating codebooks for vector quantization of digital video content, the system comprising: a storage facility; and one or more processors configured to: perform entropy decoding on a pre-compressed training video stream to provide a decoded video stream, wherein the pre-compressed training video stream is an MPEG-compressed video stream including entropy coding; partition the decoded video stream into segments, the segments including image data segments, motion data segments, and control data segments; group the image data segments to form a first vector, wherein the first vector is longer than any one of the image data segments; group the motion data segments to form a second vector, wherein the second vector is longer than any one of the motion data segments; group the control data segments to form a third vector, wherein the third vector is longer than any one of the control data segments; generate entries in at least one codebook of the codebooks, the entries based on at least one of the first vector, the second vector, and the third vector; and associate an index value with each of the entries, wherein the index value is shorter than the entries such that the index value provides a compressed representation of the entries.

Example 10 includes the subject matter of Example 9, wherein the one or more processors are further configured to entropy decode the pre-compressed training video stream by using at least one of Context Adaptive Arithmetic decoding, Context Adaptive Variable Length decoding and Huffman decoding.

Example 11 includes the subject matter of Example 9 or 10, wherein the grouping of the partitioned segments is a grouping of contiguous fields of a Macroblock.

Example 12 includes the subject matter of any of the previous Examples, wherein the image data segments are Discrete Cosine Transform (DCT) blocks associated with a Macroblock, the motion data segments are motion vectors associated with the Macroblock and the control data segments are Macroblock flags.

Example 13 includes the subject matter of any of the previous Examples, wherein the one or more processors are further configured to generate a plurality of codebooks, wherein each of the codebooks is to store vectors associated with DCT blocks and motion vectors of a selected size.

Example 14 includes the subject matter of any of the previous Examples, wherein the one or more processors are further configured to: determine a size of the Macroblock data; if the size of the Macroblock data is less than a selected threshold size, form a single vector from the DCT blocks, the motion vectors and the Macroblock flags; and generate an indexed entry in one or more of the codebooks based on the single vector.

Example 15 includes the subject matter of any of the previous Examples, wherein the one or more processors are further configured to reduce the number of entries in the codebook by applying a clustering algorithm to the vectors to select and retain vectors that are most representative of the pre-compressed training video stream.

The foregoing description of example embodiments of the disclosure has been presented for the purposes of illustration and description. It is not intended to be exhaustive or to limit the disclosure to the precise forms disclosed. Many modifications and variations are possible in light of this disclosure. It is intended that the scope of the disclosure be limited not by this detailed description, but rather by the claims appended hereto.

What is claimed is:

1. A method for generating a codebook for vector quantization of digital video content, the method comprising:
    performing entropy decoding on a pre-compressed training video stream to provide a decoded video stream;
    partitioning the decoded video stream into a plurality of data segment clusters including a first data segment cluster comprising a plurality of image data segments, a second data segment cluster comprising a plurality of motion data segments, and a third data segment cluster comprising a plurality of control data segments;
    grouping at least one of the plurality of data segment clusters to form a data vector that is longer than each data segment in the grouped at least one data segment cluster;
    generating a codebook entry that is at least partially based on the data vector; and
    associating an index value with the generated codebook entry, wherein the index value is shorter than, and provides a compressed representation of, the generated codebook entry.

2. The method of claim 1, wherein:
    each of more than one of the plurality of data segment clusters are grouped to form a corresponding data vector that is longer than each data segment in the grouped corresponding data segment cluster;
    the method further comprises applying a clustering algorithm to the corresponding data vectors; and
    the clustering algorithm is configured to select and retain codebook entries that are based on vectors that are most representative of the pre-compressed training video stream.

3. The method of claim 1, further comprising:
    selecting a codebook based on a dimensional size of data segments included in the at least one of the plurality of data segment clusters that is grouped to from the data vector; and
    mapping the generated codebook entry to the selected codebook.

4. The method of claim 1, wherein the image data segments in the first data segment cluster are Discrete Cosine Transform blocks associated with a single macroblock that forms part of the pre-compressed training video stream.

5. The method of claim 1, wherein the entropy decoding of the pre-compressed training video stream includes at least one of Context Adaptive Arithmetic decoding, Context Adaptive Variable Length decoding, and Huffman decoding.

6. The method of claim 1, wherein the pre-compressed training video stream is an MPEG-compressed video stream.

7. The method of claim 1, further comprising storing the generated codebook entry in a codebook comprising entries based on vectors associated with segments corresponding to a particular size threshold.

8. A computer program product comprising one or more non-transitory computer readable media encoded with instructions that, when executed by one or more processors, cause a process for generating a codebook for vector quantization of digital video content to be invoked, the process comprising:
   performing entropy decoding on a pre-compressed training video stream to provide a decoded video stream;
   partitioning the decoded video stream into a plurality of data segment clusters including a first data segment cluster comprising a plurality of image data segments, a second data segment cluster comprising a plurality of motion data segments, and a third data segment cluster comprising a plurality of control data segments;
   grouping a particular one of the plurality of data segment clusters to form a data vector that is longer than each data segment in the grouped particular data segment cluster;
   generating a codebook entry that is at least partially based on the data vector; and
   associating an index value with the generated codebook entry, wherein the index value is shorter than, and provides a compressed representation of, the generated codebook entry.

9. The computer program product of claim 8, wherein:
   each of more than one of the plurality of data segment clusters are grouped to form a corresponding data vector that is longer than each data segment in the grouped corresponding data segment cluster;
   the process further comprises applying a clustering algorithm to the corresponding data vectors; and
   the clustering algorithm is configured to select and retain codebook entries that are based on vectors that are most representative of the pre-compressed training video stream.

10. The computer program product of claim 8, wherein the process further comprises:
   selecting a codebook based on a dimensional size of data segments in the particular data segment cluster that is grouped to from the data vector; and
   mapping the generated codebook entry to the selected codebook.

11. The computer program product of claim 8, wherein the image data segments in the first data segment cluster are Discrete Cosine Transform blocks associated with a single macroblock that forms part of the pre-compressed training video stream.

12. The computer program product of claim 8, wherein the entropy decoding of the pre-compressed training video stream includes at least one of Context Adaptive Arithmetic decoding, Context Adaptive Variable Length decoding, and Huffman decoding.

13. The computer program product of claim 8, wherein the pre-compressed training video stream is an MPEG-compressed video stream.

14. The computer program product of claim 8, wherein the process further comprises storing the generated codebook entry in a codebook comprising entries based on vectors associated with segments corresponding to a particular size threshold.

15. A system for generating a codebook for vector quantization of digital video content, the system comprising a memory and one or more processors configured to:
   perform entropy decoding on a pre-compressed video stream to provide a decoded video stream;
   partition the decoded video stream into a plurality of data segment clusters including a first data segment cluster comprising a plurality of image data segments, a second data segment cluster comprising a plurality of motion data segments, and a third data segment cluster comprising a plurality of control data segments;
   group at least one of the plurality of data segment clusters to form a data vector that is longer than each data segment in the grouped at least one data segment cluster;
   generate a codebook entry that is at least partially based on the data vector; and
   associate an index value with the generated codebook entry, wherein the index value is shorter than, and provides a compressed representation of, the generated codebook entry.

16. The system of claim 15, wherein:
   each of more than one of the plurality of data segment clusters are grouped to form a corresponding data vector that is longer than each data segment in the grouped corresponding data segment cluster;
   the one or more processors are further configured to apply a clustering algorithm to the corresponding data vectors; and
   the clustering algorithm is configured to select and retain codebook entries that are based on vectors that are most representative of the pre-compressed video stream.

17. The system of claim 15, wherein the one or more processors are further configured to:
   select a codebook based on a dimensional size of data segments included in the at least one of the plurality of data segment clusters that is grouped to from the data vector; and
   map the generated codebook entry to the selected codebook.

18. The system of claim 15, wherein the image data segments in the first data segment cluster are Discrete Cosine Transform blocks associated with a single macroblock that forms part of the pre-compressed video stream.

19. The system of claim 15, wherein the entropy decoding of the pre-compressed video stream includes at least one of Context Adaptive Arithmetic decoding, Context Adaptive Variable Length decoding, and Huffman decoding.

20. The system of claim 15, wherein the pre-compressed video stream is an MPEG-compressed video stream.

* * * * *